(12) United States Patent
Legerton et al.

(10) Patent No.: US 11,990,129 B2
(45) Date of Patent: May 21, 2024

(54) DISPLAY EYEWEAR WITH AUDITORY ENHANCEMENT

(71) Applicant: Innovega, Inc., Bellevue, WA (US)

(72) Inventors: Jerome A. Legerton, Jupiter, FL (US); Jay Marsh, Bonsall, CA (US); Stephen Willey, Blaine, WA (US)

(73) Assignee: Innovega, Inc., Bellevue, WA (US)

( * ) Notice: Subject to any disclaimer, the term of this patent is extended or adjusted under 35 U.S.C. 154(b) by 56 days.

(21) Appl. No.: 16/915,951

(22) Filed: Jun. 29, 2020

(65) Prior Publication Data
US 2021/0407513 A1    Dec. 30, 2021

(51) Int. Cl.
| | | |
|---|---|---|
| *G10L 15/26* | (2006.01) | |
| *G06F 3/01* | (2006.01) | |
| *G06F 3/16* | (2006.01) | |
| *G10L 15/25* | (2013.01) | |
| *G10L 21/06* | (2013.01) | |
| *G10L 21/10* | (2013.01) | |

(52) U.S. Cl.
CPC .............. *G10L 15/26* (2013.01); *G06F 3/013* (2013.01); *G06F 3/167* (2013.01); *G10L 15/25* (2013.01); *G10L 21/10* (2013.01); *G10L 2021/065* (2013.01)

(58) Field of Classification Search
CPC ......... G10L 15/26; G10L 15/25; G10L 21/10; G10L 2021/065; G02B 27/0093; G02B 27/0172; G02B 2027/0178; G06F 3/013; G06F 3/167; G06F 3/017; G06V 40/28; G06V 40/19; H04R 1/10; H04R 2460/13; H04R 3/005; H04R 2201/40; H04R 2227/003; H04R 2430/20; H04R 2499/15; H04R 1/028
See application file for complete search history.

(56) References Cited

U.S. PATENT DOCUMENTS

| | | | |
|---|---|---|---|
| 9,848,260 B2 * | 12/2017 | Conliffe | G02C 11/10 |
| 10,048,724 B1 * | 8/2018 | Yang | G06F 3/03543 |
| 10,536,783 B2 | 1/2020 | Sanger et al. | |
| 10,748,523 B2 * | 8/2020 | Engelke | H04W 4/06 |

(Continued)

FOREIGN PATENT DOCUMENTS

WO    2015143114 A1    9/2015

OTHER PUBLICATIONS

Jafri et al., "Exploring the Potential of Eyewear-Based Wearable Display Devices for Use by the Visually Impaired," 2014 3rd International Conference on User Science and Engineering (i-USEr). Retrieved on Oct. 9, 2021 form <https://ieeexplore.ieee.org/stamp/stamp.jsp?tp=&arnumber=7002688>.

(Continued)

*Primary Examiner* — Fariba Sirjani
(74) *Attorney, Agent, or Firm* — Sheppard Mullin Richter & Hampton LLP

(57) ABSTRACT

Some embodiments provide display eyewear with auditory enhancement. In general, one aspect disclosed features a head-wearable apparatus comprising: a microphone; a display panel visible to the wearer; a gaze tracker configured to determine a direction of a gaze of a wearer of the head-wearable apparatus; and a controller configured to: extract speech from sound collected by the microphone from the determined direction, and present the extracted speech on the display panel.

21 Claims, 10 Drawing Sheets

(56) References Cited

U.S. PATENT DOCUMENTS

| | | | |
|---|---|---|---|
| 11,234,073 B1* | 1/2022 | Xu | G10K 11/17857 |
| 2002/0103649 A1* | 8/2002 | Basson | G09B 21/00 |
| | | | 704/E11.003 |
| 2002/0161582 A1* | 10/2002 | Basson | G10L 21/06 |
| | | | 704/E21.02 |
| 2003/0043196 A1* | 3/2003 | Gibson | G06F 3/14 |
| | | | 715/776 |
| 2004/0155889 A1* | 8/2004 | Reber | G08B 5/229 |
| | | | 345/619 |
| 2005/0117771 A1* | 6/2005 | Vosburgh | H04R 3/005 |
| | | | 381/376 |
| 2012/0282976 A1* | 11/2012 | Suhami | G10K 11/17857 |
| | | | 381/314 |
| 2014/0270316 A1* | 9/2014 | Fan | H04R 1/028 |
| | | | 381/381 |
| 2015/0036856 A1* | 2/2015 | Pruthi | G10L 15/26 |
| | | | 381/317 |
| 2015/0063603 A1 | 3/2015 | Henderek | |
| 2015/0088500 A1* | 3/2015 | Conliffe | H04R 3/005 |
| | | | 704/235 |
| 2015/0348550 A1 | 12/2015 | Zhang | |
| 2017/0139211 A1 | 5/2017 | Trail | |
| 2017/0277257 A1* | 9/2017 | Ota | G02B 27/017 |
| 2019/0174237 A1 | 6/2019 | Lunner et al. | |
| 2020/0004326 A1* | 1/2020 | Sipolins | G06T 19/006 |
| 2021/0080763 A1* | 3/2021 | Sulai | G02B 5/0289 |
| 2022/0021985 A1* | 1/2022 | Wexler | G06V 20/20 |

OTHER PUBLICATIONS

International Search Report and Written Opinion in PCT/US2021/038731, dated Oct. 6, 2021.

International Preliminary Report on Patentability for Application No. PCT/US2021/038731, dated Jan. 12, 2023, 12 pages.

* cited by examiner

DISPLAY EYEWEAR WITH AUDITORY ENHANCEMENT

DESCRIPTION OF RELATED ART

The disclosed technology relates generally to display eyewear, and more particularly some embodiments relate to display eyewear with auditory capabilities.

SUMMARY

In general, one aspect disclosed features a head-wearable apparatus comprising: a microphone; a display panel visible to the wearer; a gaze tracker configured to determine a direction of a gaze of a wearer of the head-wearable apparatus; and a controller configured to: extract speech from sound collected by the microphone from the determined direction, and present the extracted speech on the display panel.

Embodiments of the head-wearable apparatus may include one or more of the following features. In some embodiments, the controller is further configured to present the extracted speech as text on the display panel. In some embodiments, the controller is further configured to present the text on the display panel as multiple words concurrently. In some embodiments, the controller is further configured to present the text on the display panel as single words presented in a temporal series. In some embodiments, the controller is further configured to present the extracted speech as hand signs on the display panel. Some embodiments comprise an off-axis projector configured to project the extracted words onto the display panel; wherein the display panel comprises a transflective diffuser. In some embodiments, the display panel is one of: transparent; and occluded. In some embodiments, the microphone is a directional microphone. In some embodiments, the microphone comprises an array of microphone elements. Some embodiments comprise an auditory transducer; wherein the controller is further configured to provide, to the auditory transducer, audio representing the isolated sound, wherein the auditory transducer renders the audio. Some embodiments comprise a hearing aid system comprising the auditory transducer. Some embodiments comprise an auditory transducer; wherein the controller is further configured to provide, to the auditory transducer, audio representing the extracted speech, wherein the auditory transducer renders the audio. In some embodiments, the auditory transducer comprises at least one of: a loudspeaker; an ear speaker; and a bone conduction auditory system. Some embodiments comprise a further microphone configured to collect further sound from the sides and rear of the wearer's head; and an auditory transducer; wherein the controller is further configured to provide, to the auditory transducer, audio representing the further sound collected by the further microphone responsive to the further sound representing a predetermined keyword, wherein the auditory transducer renders the further audio. In some embodiments, the head-wearable apparatus is a pair of eyeglasses. In some embodiments, the head-wearable apparatus is an extended reality headset.

In general, one aspect disclosed features a non-transitory machine-readable storage medium encoded with instructions executable by a hardware processor of a computing component, the machine-readable storage medium comprising instructions to cause the hardware processor to perform a method for a head-wearable apparatus, the method comprising: determining a direction of a gaze of a wearer of the head-wearable apparatus; collecting sound emanating from the determined direction; extracting speech from the collected sound; and presenting the extracted speech on a display panel of the head-wearable apparatus, wherein the display panel is visible to the wearer.

Embodiments of the non-transitory machine-readable storage medium may include one or more of the following features. In some embodiments, the method further comprises: presenting the extracted speech as text on the display panel. In some embodiments, the method further comprises: presenting the text on the display panel as multiple words concurrently. In some embodiments, the method further comprises: presenting the text on the display panel as single words presented in a temporal series. In some embodiments, the method further comprises: projecting the text onto the display panel using an off-axis projector; wherein the display panel is a transflective diffuser. In some embodiments, the display panel is one of: transparent; and occluded. In some embodiments, the method further comprises: presenting the extracted speech as hand signs on the display panel. In some embodiments, the method further comprises: providing audio representing the collected sound to an auditory transducer of the head-wearable apparatus, wherein the auditory transducer renders the audio. In some embodiments, the method further comprises: providing audio representing the extracted speech to an auditory transducer of the head-wearable apparatus, wherein the auditory transducer renders the audio. In some embodiments, the method further comprises: collecting further sound from the sides and rear of the wearer's head; and providing further audio representing the further sound to an auditory transducer of the head-wearable apparatus responsive to the further sound representing a predetermined keyword, wherein the auditory transducer renders the further audio. In some embodiments, the head-wearable apparatus is a pair of eyeglasses. In some embodiments, the head-wearable apparatus is an extended reality headset.

In general, one aspect disclosed features a head-wearable apparatus comprising: a display panel visible to a wearer of the head-wearable apparatus; a gaze tracker configured to determine a direction of a gaze of a wearer of the head-wearable apparatus; a camera to capture images of a mouth of a person in the determined direction; and a controller configured to: extract speech from the images, and present the extracted speech on the display panel.

Embodiments of the head-wearable apparatus may include one or more of the following features. In some embodiments, the controller is further configured to present the extracted speech as text or hand signs. In some embodiments, the camera is further configured to capture images of the person's mouth; and the controller is further configured to extract speech from the images of the person's mouth. In some embodiments, the method further comprises: the camera is further configured to capture images of the person's hands; and the controller is further configured to extract speech from the images of the person's hands.

In general, one aspect disclosed features a non-transitory machine-readable storage medium encoded with instructions executable by a hardware processor of a computing component, the machine-readable storage medium comprising instructions to cause the hardware processor to perform a method for a head-wearable apparatus, the method comprising: determining a direction of a gaze of a wearer of the head-wearable apparatus; capturing images of a person in the determined direction; and extracting speech from the images, and presenting the extracted speech on a display panel of the head-wearable apparatus, wherein the display panel is visible to the wearer.

Embodiments of the non-transitory machine-readable storage medium may include one or more of the following features. In some embodiments, the method further comprises: presenting the extracted speech as text or hand signs. In some embodiments, the method further comprises: capturing images of the person's mouth; and extracting speech from the images of the person's mouth. In some embodiments, the method further comprises: capturing images of the person's hands; and extracting speech from the images of the person's hands.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
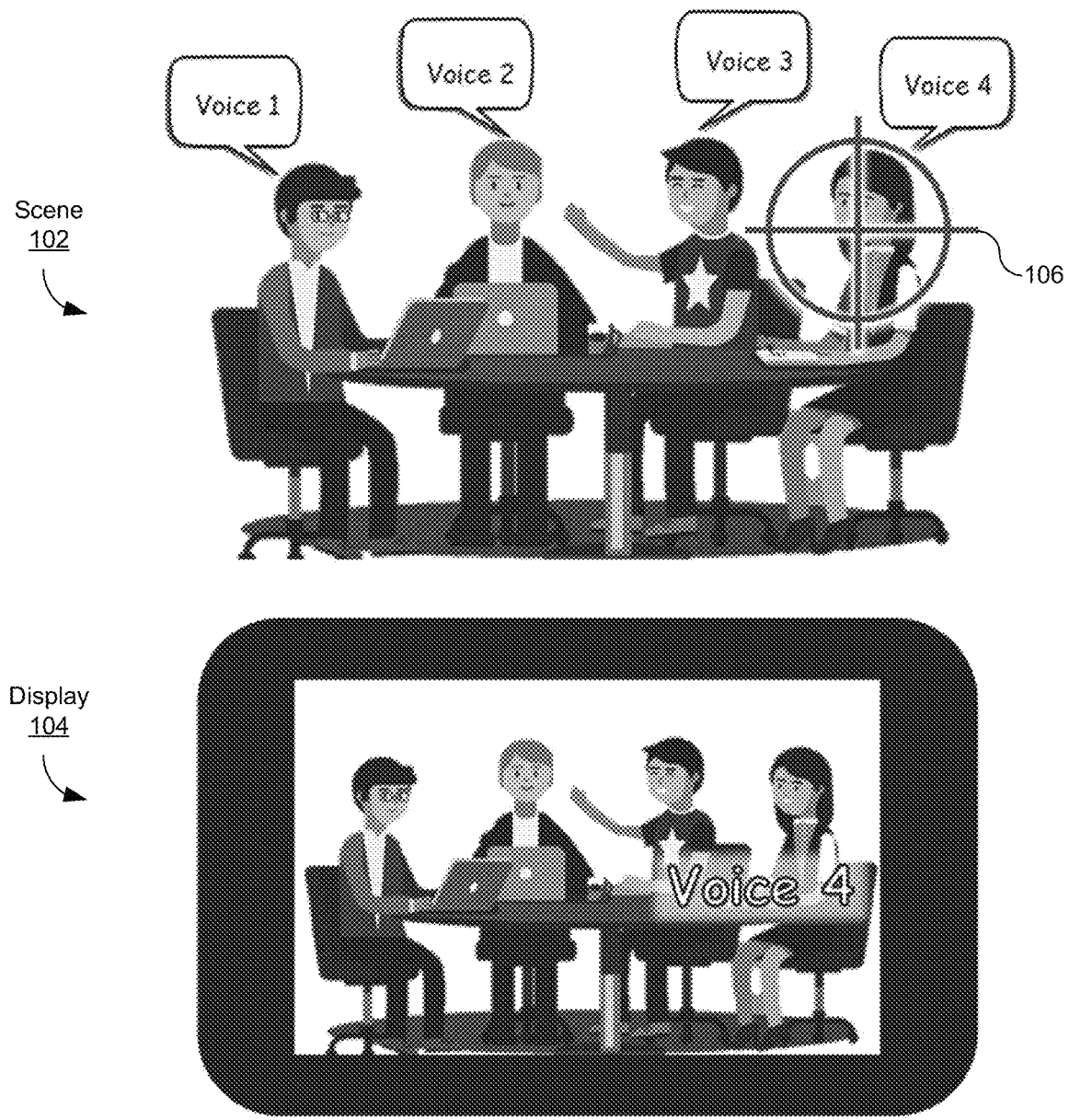
FIG. 1 illustrates an use case according to some embodiments of the disclosed technology.

The figures are not exhaustive and do not limit the present disclosure to the precise form disclosed.

DETAILED DESCRIPTION

Many people suffer from some degree of hearing loss. Hearing loss can occur when any part of the ear or auditory system is not working properly. The United States Centers For Disease Control And Prevention (CDC) has identified four types of hearing loss. Conductive hearing loss is caused by something that prevents sounds from passing through the outer or middle ear. Sensorineural hearing loss occurs when there is a problem with the inner ear or auditory nerve. Mixed hearing loss is a combination of both conductive and sensorineural hearing loss. Auditory neuropathy spectrum disorder is a hearing loss that occurs when sound enters the ear normally, but due to damage to the inner ear or auditory nerve, the sound isn't organized in a way that the brain can understand.

Hearing aids have been developed to help people with hearing loss. While very beneficial, conventional hearing aids collect sounds from many directions, which makes it difficult for the listener to isolate and perceive sounds of interest.

While the disclosed technology benefits those with hearing loss, it also benefits those without such a loss. For example, the disclosed technology may allow a user with no hearing loss to perceive sounds and speech the user could otherwise not perceive.

Embodiments of the disclosed technology provide display eyewear that may collect and isolate sounds of interest according to a direction of a gaze of the user. That is, the disclosed display eyewear may determine the direction in which the user is looking, and may collect and isolate sounds from that direction. In some embodiments, the display eyewear may perform speech recognition, and may present the speech on the display of the display eyewear, for example in the form of text, hand signs, and the like. In some embodiments, the display eyewear may also render the isolated sound for the user, for example as sound in an earpiece of the display eyewear. In some embodiments, the display eyewear may render the recognized speech for the user, for example as sound in an earpiece of the display eyewear.

The display eyewear may use microphones to collect the sound. In various embodiments, any microphone technology may be used. For example, the microphone technologies may include condenser, electret condenser, dynamic, ribbon, carbon, piezoelectric, fiber-optic, laser, liquid, micro-electromechanical system (MEMS), and the like, and combinations thereof. Various embodiments may employ different microphone patterns, for example including polar, omnidirectional, unidirectional, cardioid, hypercardioid, supercardioid, subcardioid, lobar, bidirectional, shotgun, boundary or pressure zone microphone (PZM), and the like, and combinations thereof. In embodiments having multiple microphones and microphone elements, the selection of microphones or microphone elements may be controlled by gaze, gesture, voice, or other user interface controls.

Various embodiments may employ sound modulation to improve auditory perception. For example, sound modulation may include selection of different volume levels for different frequencies. Sound modulation may be controlled by the user in accordance with gaze direction, gesture, voice, or other user interface controls. In this manner, the user may mix the sounds to enhance perception of desired sounds, and to reduce or eliminate unwanted sounds.

In some embodiments, the display eyewear may include a camera for capturing images of a person in the gaze of the user, and may extract speech of the person from the images using lip-reading techniques. In these embodiments the display eyewear may present the recognized speech to the user as text, hand signs, sound, or a combination thereof.

FIG. 1 illustrates a use case according to some embodiments of the disclosed technology. At the top of FIG. 1 is an example scene 102, as perceived by a user of the display eyewear. In the example scene 102, four people are speaking concurrently, with their speech denoted as "Voice 1", "Voice 2", "Voice 3", and "Voice 4", respectively, from left to right. In this example, the user's gaze rests upon the person on the right, as indicated by the reticle 106.

At the bottom of FIG. 1 is an example display 104 produced by the display eyewear for the example scene 102. The example display 104 includes the four people. The example display 104 also presents text of the speech of the person on the right, denoted as "Voice 4". In this example, the display eyewear has isolated the voice of the person on the right in the example scene 102, recognized the speech of that person, and presented that speech as text in the example display 104.

Figure 2:
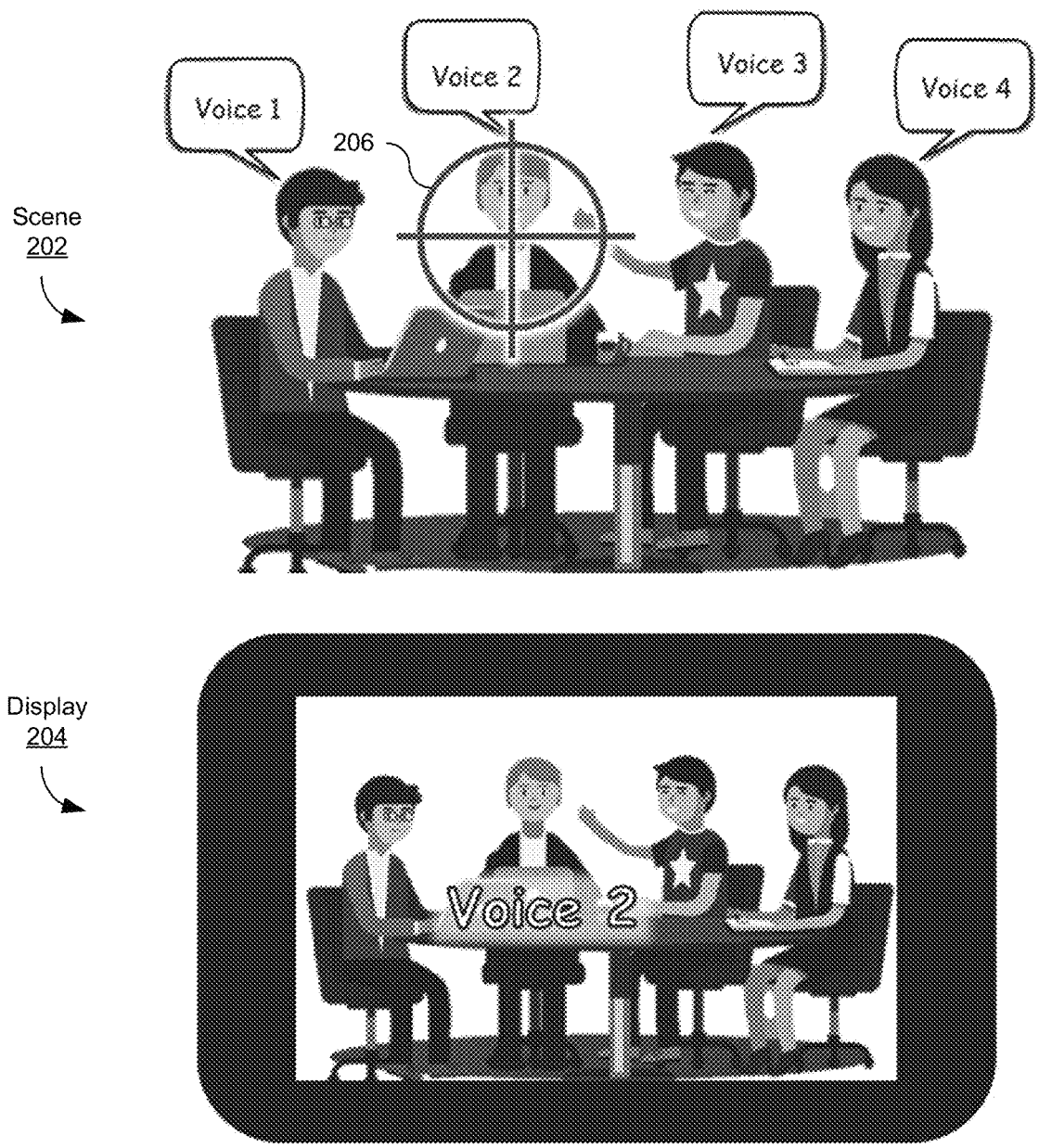
FIG. 2 continues the use case of FIG. 1 according to some embodiments of the disclosed technology.

FIG. 2 continues the use case of FIG. 1 according to some embodiments of the disclosed technology. At the top of FIG. 2 is an example scene 202, which is similar to the example scene 102 of FIG. 1, but at a different time. In the example scene 202, the four people are again speaking concurrently. In this example, the user's gaze rests upon the second person from the left, as indicated by the reticle 206.

At the bottom of FIG. 2 is an example display 204 produced by the display eyewear for the example scene 202. The example display 204 includes the four people. The example display 204 also presents text of the speech of the second person from the left, denoted as "Voice 2". In this example, the display eyewear has isolated the voice of the second person on the left in the example scene 202, recognized the speech of that person, and presented that speech as text in the example display 204.

Figure 3:
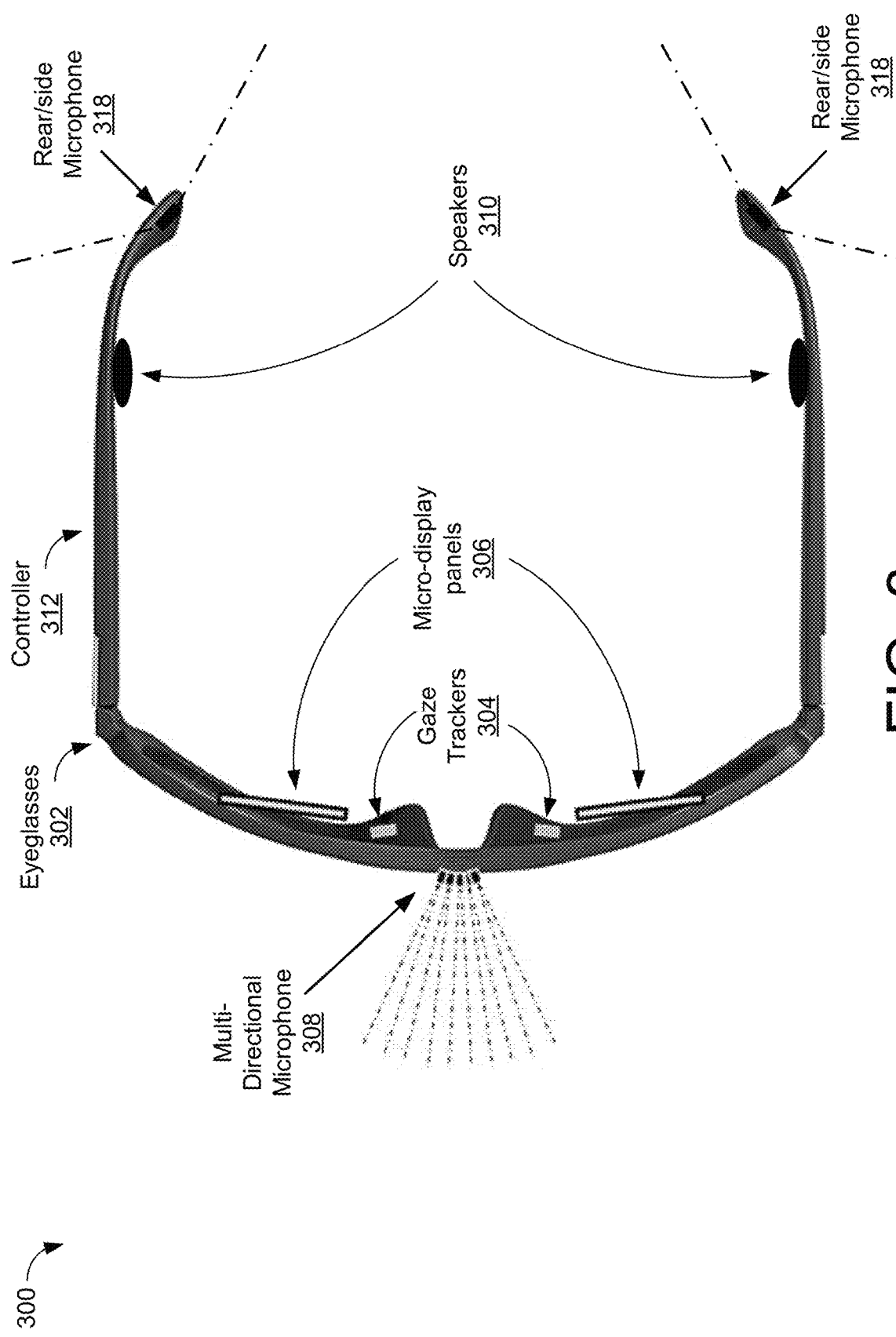
FIG. 3 illustrates display eyewear with a multi-directional microphone according to some embodiments of the disclosed technology.

FIG. 3 illustrates example display eyewear with a multi-directional microphone according to some embodiments of the disclosed technology. Referring to FIG. 3, the display eyewear 300 may be implemented using a pair of eyeglasses 302. The eyeglasses may include a front, one or more temples, and one or more lenses. The front may rest upon the bridge of the nose of a user. Each temple may rest upon an ear of the user. But while the described embodiment is implemented using a pair of eyeglasses, it should be understood that other embodiments may be implemented using any structure that can be worn on the head of the user. For example, such structures may include monocles, spectacles, headbands, hats, masks, extended-reality headsets, retinal display generators disposed on or in the eye, and the like.

The display eyewear 300 may include one or more gaze trackers 304. The gaze trackers 304 may be implemented as conventional gaze trackers, which sense the orientation of the eyeball, and determine the direction of the user's gaze based on that position. However, other gaze-tracking techniques may be used instead, or in addition to, this technique. Examples include pupil tracking, other ocular anatomic feature tracking, fiducial tracking in a contact lens, using data from accelerometers in a contact lens or intraocular lens, and the like. However, any type of gaze trackers may be used. As used herein the term "contact lens" means a lens in contact with ocular tissue, and may include intracorneal lenses, intraocular lenses, and the like.

The display eyewear 300 may include one or more micro-display panels 306. Each micro-display panel 306 may be disposed above or within the resting line of sight of the eye of the user. Each micro-display panel 306 may be implemented as a digital display panel, for example such as an LCD, LCOS, or OLED display panel. However, any sort of display capable of performing the functions described herein may be used. The display may utilize waveguide technology, lightfield technology, off axis projection, holographic reflection, femto projectors or any other means of producing near eye, on eye or intraocular images. The micro-display panels 306 may be transparent or occluded. Transparent displays may employ technology including geometric optics, waveguide relay, transflective diffuser with projection, multi-pinpoint reflector, direct retinal projection, in-lens femto-projectors, all in some combination with MEMS scanner, LCOS, OLED, LCD, and LED. Occluded displays may employ technology including geometric optics, waveguide relay, reflective diffuser with projection, multi-pinpoint reflector, all in some combination with MEMS scanner, LCOS, OLED, LCD, LED, and in combination with obscuration shields.

In some embodiments, the display eyewear 300 may include a user interface that allows the user to transition the micro-display panels 306 between transparent and occluded states. In some embodiments, the display eyewear 300 may include an off-axis projector configured to project images such as text and hand signs onto the micro-display panels 306. In such embodiments, the micro-display panels 306 may comprise a transflective diffuser. In some embodiments all or part of the micro-display panels 306 may be disposed within a contact lens or an intraocular lens.

The display eyewear 300 may include a multi-directional microphone 308. The microphone 308 may be mounted on the front of the display eyewear 300, for example on the nosepiece of the eyeglasses 302. The coverage of the multi-directional microphone 308 may be selected according to the needs of the user. The multi-directional microphone 308 may include one or more elements. The multi-directional microphone 308 may include multiple elements disposed in a fan pattern to face different directions, as illustrated in FIG. 3. Each element may employ a directional pattern, for example such as a lobar pattern. Each element may have a different channel. Each channel may be modulated by gaze direction, other means, and the like.

The display eyewear 300 may include one or more auditory transducers. In the example of FIG. 3, the auditory transducers may be implemented as a pair of speakers 310 mounted on the temples of the eyeglasses 302, near the user's ears. In some embodiments, the auditory transducers may be implemented as loudspeakers, ear speakers, a bone conduction auditory system, and the like, and combinations thereof. In some embodiments, the auditory transducers may be part of a hearing aid system.

In some embodiments, the display eyewear 300 may include a controller 312. The controller 312 may process the data produced by the gaze trackers 304 to determine a direction of the gaze of the user. The controller 312 may process sounds collected by the microphone 308. The controller 312 may generate audio, and provide the audio to the speakers 310. The controller 312 may generate displays, and provide the displays to the micro-display panels 306. The controller 312 may be located within one of the temples, and/or within some other portion of the display eyewear 300.

In some embodiments, the display eyewear 300 may include one or more rear/side facing microphones 318 to capture sounds emanating from outside the field of view of the user. These microphones 318 may be disposed at the rear of the temples of the eyeglasses 302, as shown in FIG. 3.

It should be appreciated that the embodiments of FIG. 3 may be used, wholly or partially, in conjunction with other embodiments described herein.

Figure 4:
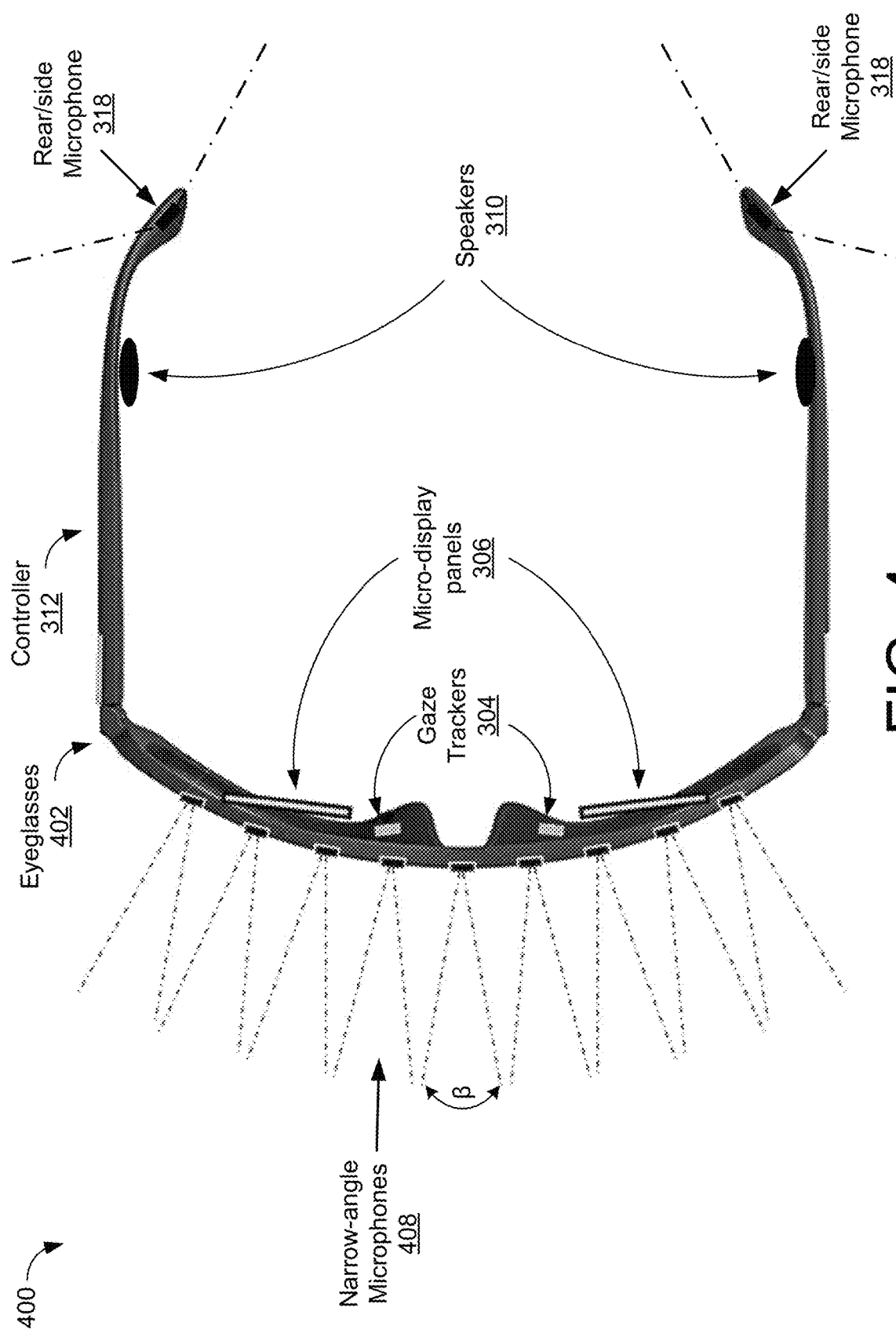
FIG. 4 illustrates display eyewear with a plurality of narrow-angle microphone according to some embodiments of the disclosed technology.

FIG. 4 illustrates display eyewear with a plurality of narrow-angle microphones according to some embodiments of the disclosed technology. Referring to FIG. 4, the display eyewear 400 may be implemented using a pair of eyeglasses 402. The eyeglasses may include a front, one or more temples, and one or more lenses. The front may rest upon the bridge of the nose of a user. Each temple may rest upon an ear of the user. But while the described embodiment is implemented using a pair of eyeglasses, it should be understood that other embodiments may be implemented using any structure that can be worn on the head of the user. For example, such structures may include headbands, hats, masks, and the like.

The display eyewear 400 may include one or more gaze trackers 304, one or more micro-display panels 306, one or more auditory transducers, one or more rear/side facing microphones 318, and a controller 312, for example as described above.

The display eyewear 400 may include a plurality of narrow-angle microphones 408. The microphones 308 may be mounted along the front of the display eyewear 400. The angles 13 of the microphones 308 may be selected according to the needs of the user.

It should be appreciated that the embodiments of FIG. 4 may be used, wholly or partially, in conjunction with other embodiments described herein.

Figure 5:
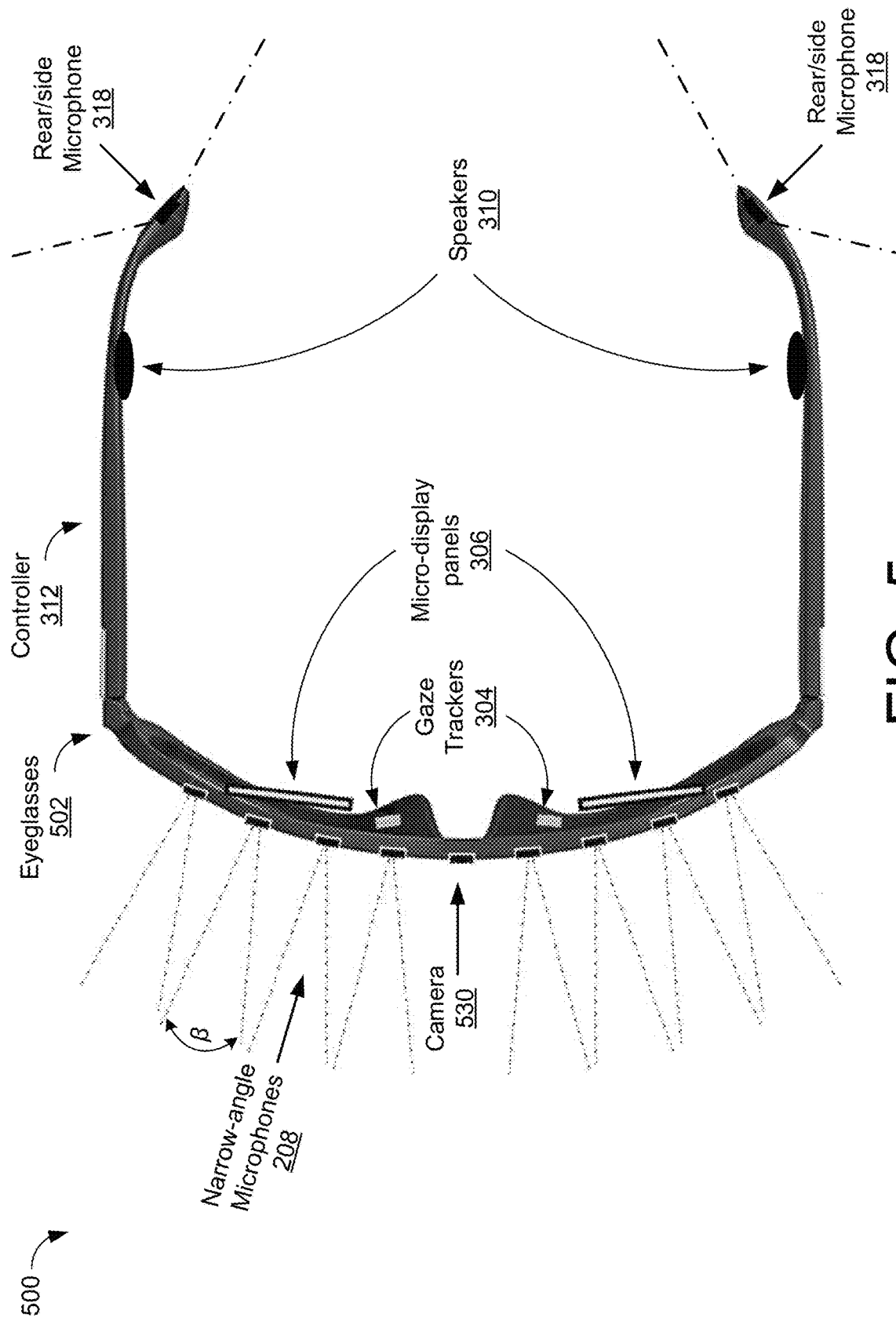
FIG. 5 illustrates display eyewear with a camera and a plurality of narrow-angle microphone according to some embodiments of the disclosed technology.

FIG. 5 illustrates display eyewear with a camera and a plurality of narrow-angle microphones according to some embodiments of the disclosed technology. Referring to FIG. 5, the display eyewear 500 may be implemented using a pair of eyeglasses 502. The eyeglasses may include a front, one or more temples, and one or more lenses. The front may rest upon the bridge of the nose of a user. Each temple may rest upon an ear of the user. But while the described embodiment is implemented using a pair of eyeglasses, it should be understood that other embodiments may be implemented using any structure that can be worn on the head of the user. For example, such structures may include headbands, hats, masks, and the like.

The display eyewear 500 may include one or more gaze trackers 304, one or more micro-display panels 306, one or more auditory transducers, one or more rear/side facing microphones 318, and a controller 312, for example as described above. The display eyewear 500 may include a plurality of narrow-angle microphones 408, for example as described above.

The display eyewear 500 may include a camera 510. The controller 312 may receive images from the camera 510, and may process those images. The controller 312 may provide images to the micro-display panels 306 based on the received and/or processed images. The camera 510 may be implemented as a digital camera, or the like. However, any sort of camera capable of performing the functions described herein may be used. In some implementations, the camera 510 can be used as a feed source for the micro-display panels 306, either contemporaneously with the image capture of the camera 510, or at a later time.

It should be appreciated that the embodiments of FIG. 5 may be used, wholly or partially, in conjunction with other embodiments described herein.

Figure 6:
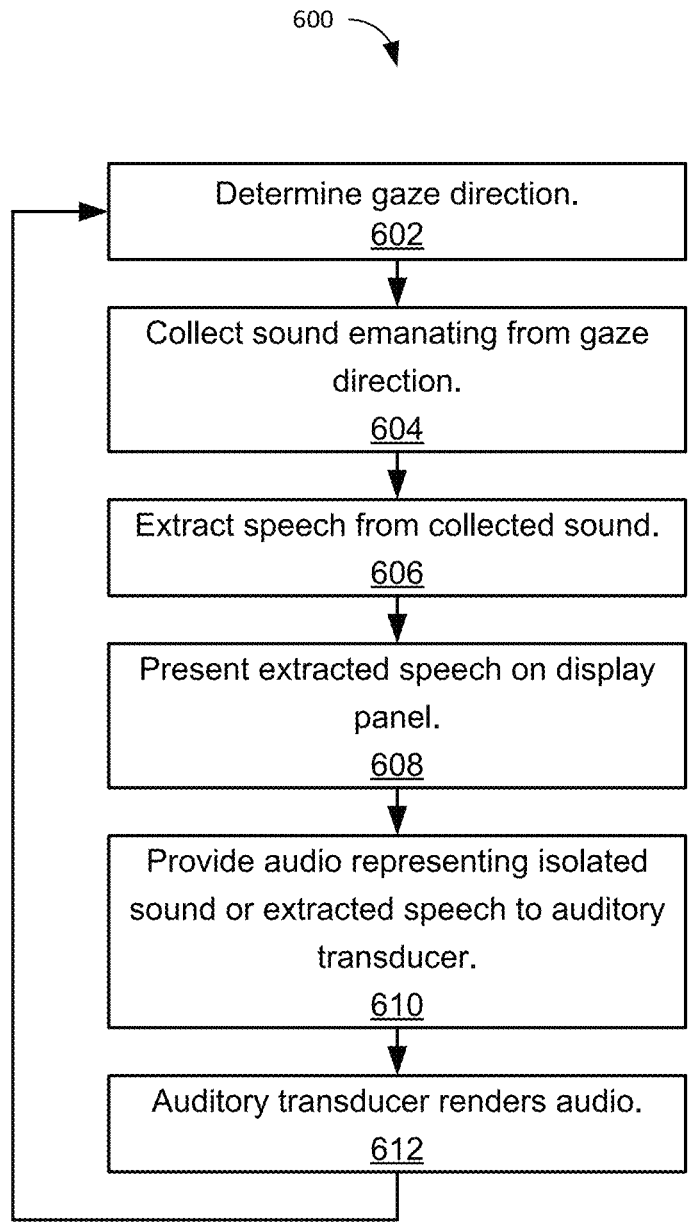
FIG. 6 illustrates an example auditory enhancement process according to embodiments of the disclosed technology.

FIG. 6 illustrates an example auditory enhancement process 600 according to some embodiments of the disclosed technology. The process 600 may be performed, for example, by the display eyewear of FIGS. 3, 4, and 5. The elements of the processes disclosed herein are presented in a particular order. However, it should be understood that one or more elements of each process may be performed in a different order, concurrently, or omitted.

Referring to FIG. 6, the process 600 may include determining a gaze direction, at 602. The gaze direction represents the direction in which the user of the display eyewear is looking. In the examples of FIGS. 3, 4, and 5, the gaze direction may be determined by the controller 312 of the display eyewear based on signals received from the gaze trackers 304.

The process 600 may include collecting sound emanating from the gaze direction, at 604. In the example of FIG. 3, the sound may be collected by the wide-angle microphone 308, which may provide an audio signal representing the collected sound to the controller 312. In the examples of FIGS. 4 and 5, sound may be collected by one or more of the narrow-angle microphones 408, which may provide audio signals representing the collected sound to the controller 312. In some embodiments, the controller 312 may isolate the sound emanating from the gaze direction by turning on one or more microphones 208 facing the gaze direction, while turning off the other microphones 208. In some embodiments, the controller 312 may use multiple microphones 208 and beamforming techniques to isolate the sound emanating from the gaze direction. Other techniques may be used instead of, or in addition to, these techniques.

Referring again to FIG. 6, the process 600 may include extracting speech from the collected sound, at 606. In the examples of FIGS. 3, 4, and 5, the controller 312 may extract the speech from the collected sound. The speech may be extracted from the collected sound using any techniques, for example including conventional speech recognition techniques.

Referring again to FIG. 6, the process 600 may include presenting the extracted speech on one or more display panels of the display eyewear, at 608. The presentation may be in real time or near-real time. In the examples of FIGS. 3, 4, and 5, the controller 312 may present the extracted speech on one or more of the micro-display panels 306. In some embodiments, the extracted speech may be presented as text. For example, the text may be presented as multiple words concurrently, for example in the form of sentences. As another example, the text may be presented as single words in a temporal series. That is, one word is presented at a time. In some embodiments, the extracted speech may be presented as hand signs, for example according to the American sign language (ASL). In some embodiments, the display eyewear may translate the speech to another language, and may present the text in that language.

In some embodiments, in addition to presenting the extracted speech on the display panels, the display eyewear may also present the collected sound or extracted speech as sound for the user. Referring again to FIG. 6, the process 600 may include providing audio representing the isolated sound or extracted speech to an auditory transducer of the display eyewear, at 610. The process 600 may include the audio transducer rendering the audio, at 612. In the examples of FIGS. 3, 4, 5, the controller 312 may provide audio representing the collected sound or extracted speech to one or more speakers 310, which render the audio as sound for the user. In various embodiments, the sound may be rendered by a loudspeaker, ear speaker, a bone conduction auditory system, cochlear implant or other hearing enhancement device, and the like, and combinations thereof. In some embodiments, the display eyewear may translate the speech to another language, and may present the speech in that language. The process 600 may continue, at 602.

Figure 7:
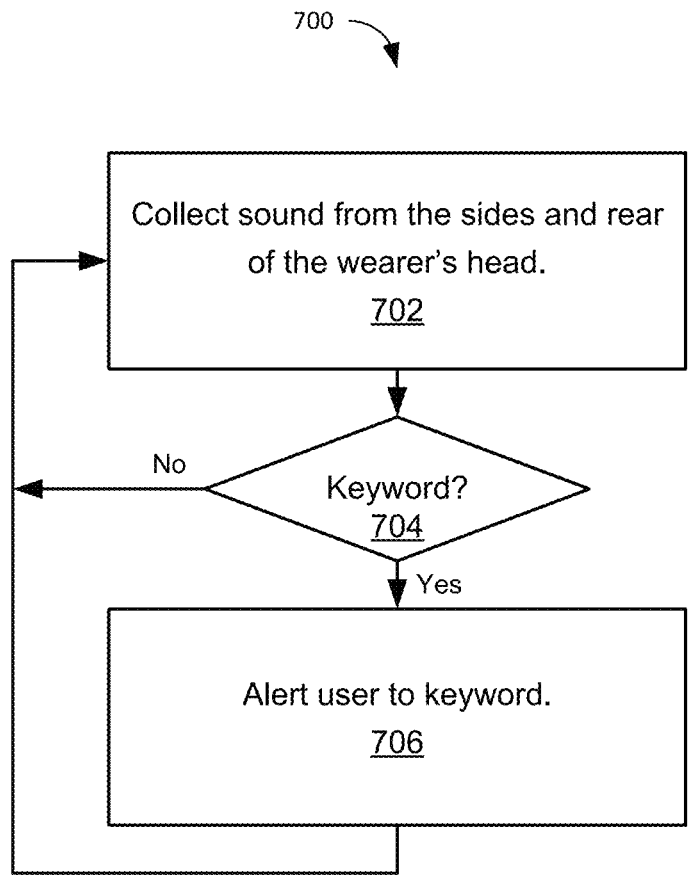
FIG. 7 illustrates a keyword-based auditory enhancement process according to embodiments of the disclosed technology.

In some embodiments, the display eyewear may include one or more side-facing and/or rear-facing microphones, which collect sound from the sides and/or rear of the user, and provide audio representing the collected sound to the controller of the display eyewear. The controller may perform speech recognition on the collected sound, and upon recognizing one or more predetermined keywords, may present the sound and/or speech to the user. FIG. 7 illustrates a keyword-based auditory enhancement process 700 according to embodiments of the disclosed technology.

Referring to FIG. 7, the process 700 may include collecting sound from the sides and rear of the wearer's head, at 702. In the examples of FIGS. 3, 4, and 5, one or more wide-angle microphones 318, which may be arranged to face to the sides and rear of the wearer's head, may collect the sound, and may provide audio representing the sound to the controller 312.

Referring again to FIG. 7, the process 700 may include determining whether a keyword is present in the collected sound, at 704. The keywords may include, for example, the user's name. In some embodiments, the display eyewear includes a user interface that allows the user to set one or more of the predetermined keywords. In the examples of FIGS. 3, 4, and 5, the controller 312 may perform speech recognition upon the collected sound, and may employ word-matching techniques to determine whether any of the words recognized in the speech match one or more predetermined keywords. However, any suitable technique may be used.

When no keyword is detected, the process 700 may include continuing to collect sound, at 702. But when a keyword is detected, the process 700 may include alerting the user to the keyword, at 706. In some embodiments, the alerting may include providing audio representing the sound to an auditory transducer, which renders the audio. In the examples of FIGS. 3, 4, and 5, the controller 312 may provide the collected audio or recognized speech to one or more speakers 310, which render the audio as sound for the user. In some embodiments, the alerting may include presenting the keyword on one or more displays of the display eyewear, for example in the form of text, hand signs, and the like. In the examples of FIGS. 3, 4, and 5, the controller 312 may present the keyword on one or more of the micro-display panels 306. In some embodiments, the keyword may be presented off center, as sound or on the displays, to indicate the direction from which the sound emanates. After alerting the user to the keyword, the process 700 may continue, at 702.

Figure 8:
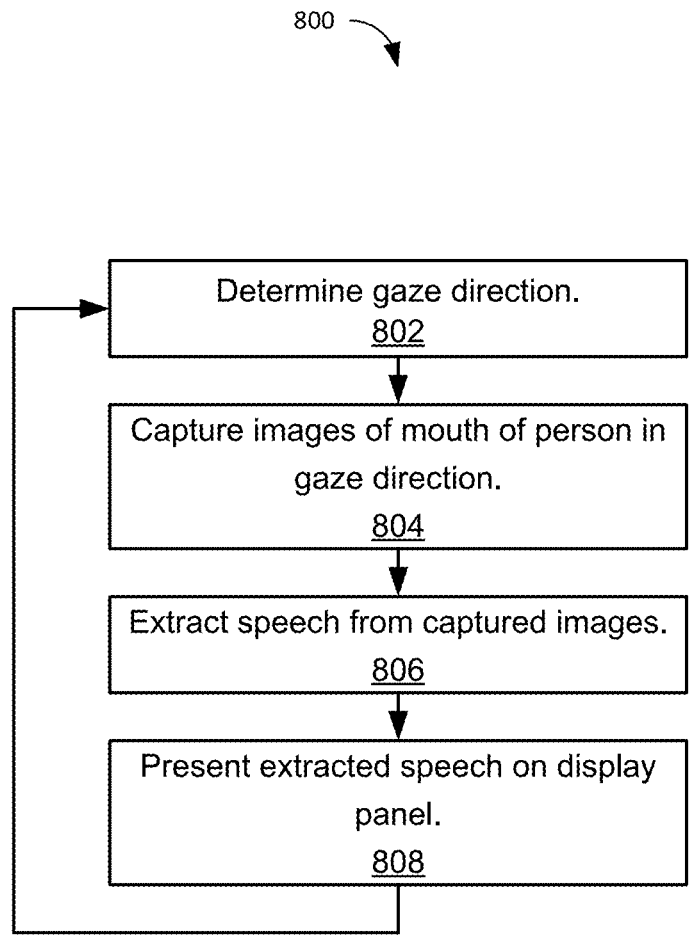
FIG. 8 illustrates a lip-reading image-based auditory enhancement process according to embodiments of the disclosed technology.

In some embodiments, the display eyewear may include a camera to capture images of people speaking, and may employ lip-reading techniques from the captured images. FIG. 8 illustrates a lip-reading image-based auditory enhancement process 800 according to embodiments of the disclosed technology.

Referring to FIG. 8, the process 800 may include determining a gaze direction, at 802. The gaze direction represents the direction in which the user of the display eyewear is looking. In the examples of FIGS. 3, 4, and 5, the gaze direction may be determined by the controller 312 of the display eyewear based on signals received from the gaze trackers 304.

The process 800 may include capturing images of the mouth of a person in the gaze direction, at 804. In the example of FIG. 5, the images may be captured by the camera 530, which may provide a video signal representing the captured images to the controller 312.

Referring again to FIG. 8, the process 800 may include extracting speech from the captured images, at 806. In the example of FIG. 5, the controller 312 may extract the speech from the captured images. The speech may be extracted from the captured images using any techniques, for example including conventional lip-reading techniques. The techniques may be implemented, for example, using artificial intelligence techniques in machine learning models.

Referring again to FIG. 8, the process 800 may include presenting the extracted speech on one or more display panels of the display eyewear, at 808. The presentation may be in real time or near-real time. In the example of FIG. 5, the controller 312 may present the extracted speech on one or more of the micro-display panels 306, for example as described above.

In some embodiments, in addition to presenting the extracted speech on the display panels, the display eyewear may also present the collected sound or extracted speech as sound for the user, for example as described above. The process 800 may continue, at 802.

Figure 9:
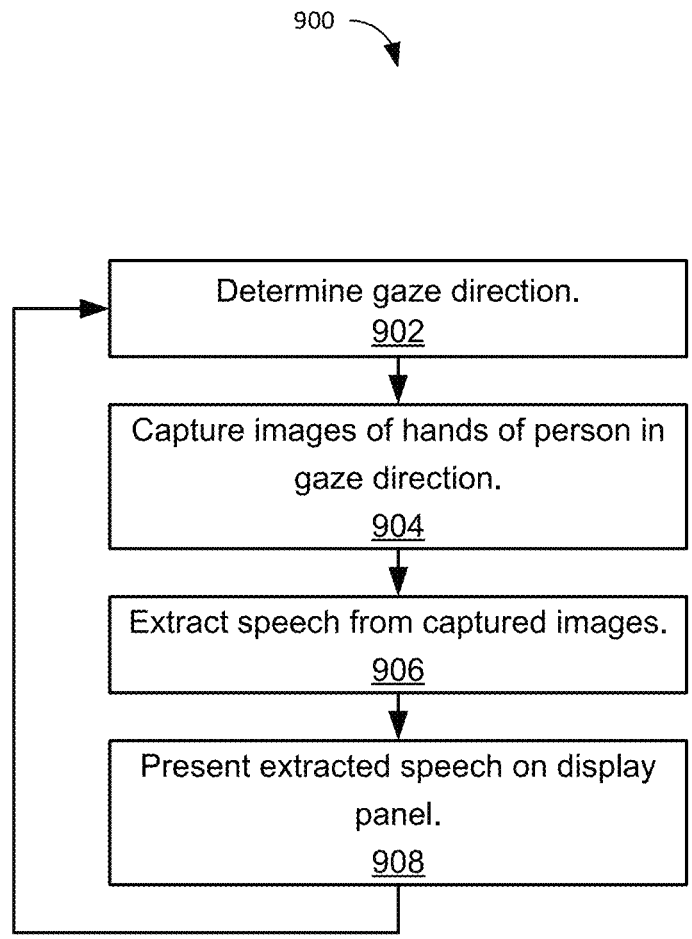
FIG. 9 illustrates a hand-sign-reading image-based auditory enhancement process according to embodiments of the disclosed technology.

In some embodiments, the display eyewear may include a camera to capture images of people's hand movements, and may employ hand sign reading techniques from the captured images. FIG. 9 illustrates a hand-sign-reading image-based auditory enhancement process 900 according to embodiments of the disclosed technology.

Referring to FIG. 9, the process 900 may include determining a gaze direction, at 902. The gaze direction represents the direction in which the user of the display eyewear is looking. In the examples of FIGS. 3, 4, and 5, the gaze direction may be determined by the controller 312 of the display eyewear based on signals received from the gaze trackers 304.

The process 900 may include capturing images of the hands of a person in the gaze direction, at 904. In the example of FIG. 5, the images may be captured by the camera 530, which may provide a video signal representing the captured images to the controller 312.

Referring again to FIG. 9, the process 900 may include extracting speech from the captured images, at 906. In the example of FIG. 5, the controller 312 may extract the speech from the captured images. The speech may be extracted from the captured images using any techniques, for example including conventional hand-sign-reading techniques. The techniques may be implemented, for example, using artificial intelligence techniques in machine learning models.

Referring again to FIG. 9, the process 900 may include presenting the extracted speech on one or more display panels of the display eyewear, at 908. The presentation may be in real time or near-real time. In the example of FIG. 5, the controller 312 may present the extracted speech on one or more of the micro-display panels 306, for example as described above. For example, the extracted speech may be presented as hand signs.

In some embodiments, in addition to presenting the extracted speech on the display panels, the display eyewear may also present the collected sound or extracted speech as sound for the user, for example as described above. The process 900 may continue, at 902.

Figure 10:
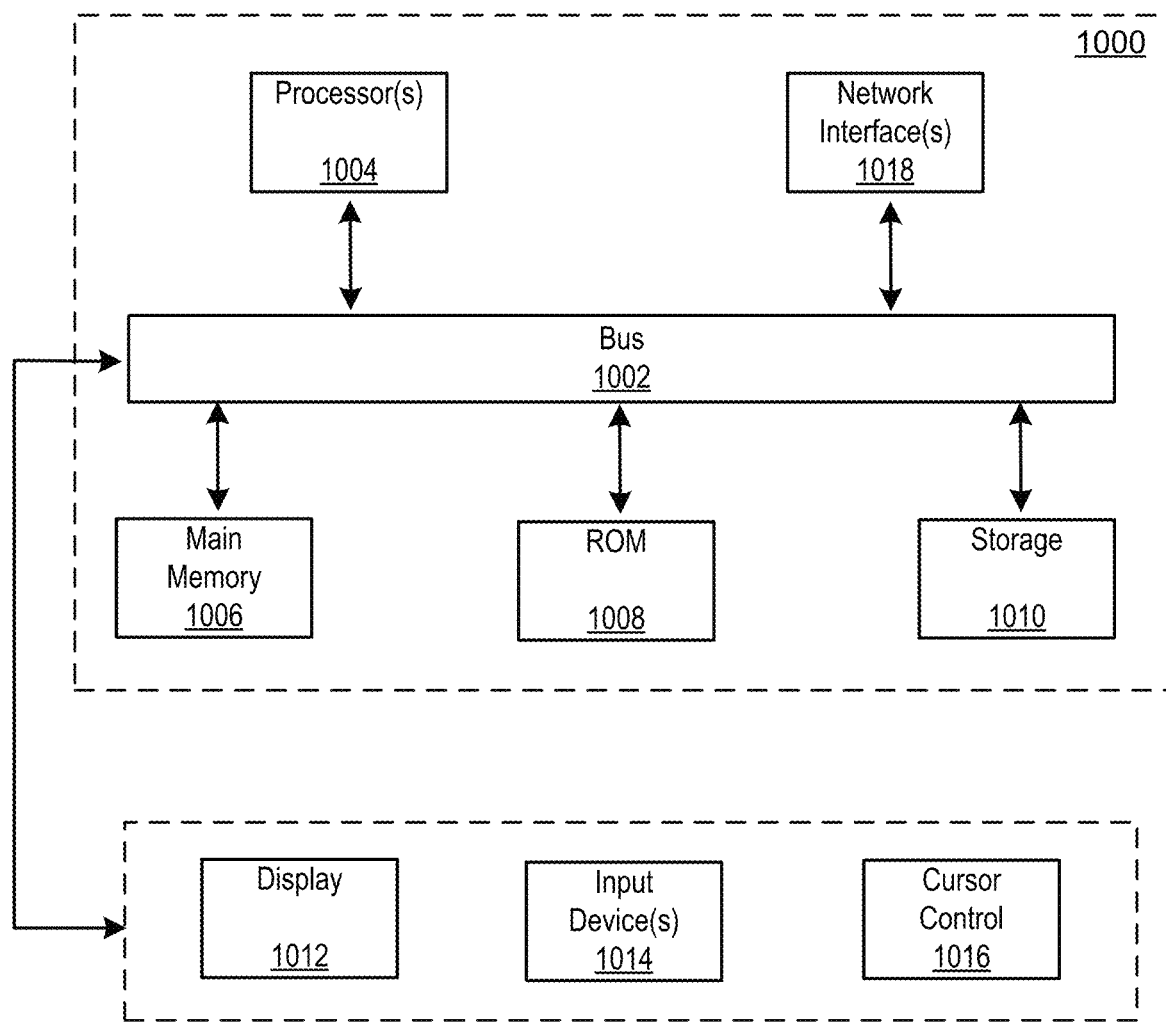
FIG. 10 is an example computing component that may be used to implement various features of embodiments described in the present disclosure.

FIG. 10 depicts a block diagram of an example computer system 1000 in which embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or a WAN component to communicate with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1000.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A head-wearable apparatus comprising:
a first microphone, located on a front end of the apparatus facing a front side of the wearer, which collects first sounds emanating from the front of a head of a wearer of the head-wearable apparatus;
a display panel visible to the wearer;
a gaze tracker configured to determine a direction of a gaze of the wearer of the head-wearable apparatus;
multiple second microphones, located on both sides and toward a back end of the apparatus and of the wearer, which collect second sounds emanating from the sides and rear of the head of the wearer;
an auditory transducer; and
a controller configured to:
extract speech from the first sounds collected by the first microphone from the determined direction,
present the extracted speech on the display panel,
provide, to the auditory transducer, second audio representing the second sounds collected by the multiple second microphones responsive to the second sounds representing a predetermined keyword, wherein the auditory transducer renders the second audio, and
present the keyword on the display panel in a location that indicates a direction from which the second sounds emanate.

2. The head-wearable apparatus of claim 1, wherein the controller is further configured to present the extracted speech as text on the display panel.

3. The head-wearable apparatus of claim 1, wherein the controller is further configured to present the extracted speech as hand signs on the display panel.

4. The head-wearable apparatus of claim 1:
wherein the controller is further configured to provide, to the auditory transducer, audio representing the first sounds collected by the first microphone from the determined direction, wherein the auditory transducer renders the audio representing the first sounds collected by the first microphone from the determined direction.

5. The head-wearable apparatus of claim 4, further comprising:
a hearing aid system comprising the auditory transducer.

6. The head-wearable apparatus of claim 1: wherein the controller is further configured to provide, to the auditory transducer, audio representing the extracted first and/or second speech, wherein the auditory transducer renders the audio.

7. The head-wearable apparatus of claim 1, wherein the head-wearable apparatus is a pair of eyeglasses.

8. A head-wearable apparatus comprising:
a first microphone, located on a front end of the apparatus facing a front side of the wearer, which collects first sounds emanating from the front of a head of a wearer of the head-wearable apparatus;
a display panel visible to the wearer;
a gaze tracker configured to determine a direction of a gaze of the wearer of the head-wearable apparatus;
multiple second microphones, located on both sides and toward a back end of the apparatus and of the wearer, which collect second sounds emanating from the sides and rear of the head of the wearer; and
a controller configured to:
extract first speech from the first sounds collected by the first microphone from the determined direction,
present the extracted first speech on the display panel, and
responsive to the second sounds representing a predetermined keyword, extracting second speech from the second sounds collected by the multiple second microphones, and presenting the extracted second speech on the display panel in a location that indicates a direction from which the second sounds emanate.

9. The head-wearable apparatus of claim 8, wherein the controller is further configured to present the extracted first and/or second speech as text on the display panel.

10. The head-wearable apparatus of claim 8, wherein the controller is further configured to present the extracted first and/or second speech as hand signs on the display panel.

11. The head-wearable apparatus of claim 8, further comprising:
an auditory transducer;
wherein the controller is further configured to provide, to the auditory transducer, audio representing the first sound collected by the first microphone from the determined direction, wherein the auditory transducer renders the audio representing the first sound collected by the first microphone from the determined direction.

12. The head-wearable apparatus of claim 11, further comprising:
a hearing aid system comprising the auditory transducer.

13. The head-wearable apparatus of claim 8, further comprising:
an auditory transducer;
wherein the controller is further configured to provide, to the auditory transducer, audio representing the extracted first and/or second speech, wherein the auditory transducer renders the audio.

14. The head-wearable apparatus of claim 8, wherein the head-wearable apparatus is a pair of eyeglasses.

15. A non-transitory machine-readable storage medium encoded with instructions executable by a hardware processor of a computing component, the machine-readable storage medium comprising instructions to cause the hardware processor to perform a method for a head-wearable apparatus, the method comprising:
determining a direction of a gaze of a wearer of the head-wearable apparatus;
collecting first sounds emanating from the determined direction using a first microphone, located on a front end of the apparatus facing a front side of the wearer, which collects the first sounds emanating from the front of a head of a wearer of the head-wearable apparatus;
extracting first speech from the collected first sounds;
presenting the extracted first speech on a display panel of the head-wearable apparatus, wherein the display panel is visible to the wearer;
collecting second sounds emanating from the sides and rear of the head of the wearer using a second microphone, located on a side and toward a back end of the apparatus and of the wearer, which collects the second sounds emanating from the sides and rear of the wearer's head;
providing audio representing the second sounds to an auditory transducer of the head-wearable apparatus responsive to the sounds representing a predetermined keyword, wherein the auditory transducer renders the second audio, and
presenting the keyword on the display panel in a location that indicates a direction from which the second sounds emanate.

16. The non-transitory machine-readable storage medium of claim 15, wherein the head-wearable apparatus is a pair of eyeglasses.

17. The non-transitory machine-readable storage medium of claim 15, the method further comprising:
presenting the extracted first and/or second speech as text on the display panel.

18. The non-transitory machine-readable storage medium of claim 15, the method further comprising:
projecting the extracted first speech onto the display panel using an off-axis projector;
wherein the display panel is a transflective diffuser.

19. The non-transitory machine-readable storage medium of claim 15, the method further comprising:
presenting the extracted first and/or second speech as hand signs on the display panel.

20. The non-transitory machine-readable storage medium of claim 15, the method further comprising:
providing audio representing the collected first sounds to an auditory transducer of the head-wearable apparatus, wherein the auditory transducer renders the audio.

21. The non-transitory machine-readable storage medium of claim 15, the method further comprising:
providing audio representing the extracted first and/or second speech to an auditory transducer of the head-wearable apparatus, wherein the auditory transducer renders the audio.

* * * * *